United States Patent [19]

Nagano

[11] Patent Number: 4,530,677
[45] Date of Patent: Jul. 23, 1985

[54] DERAILLEUR FOR A BICYCLE
[75] Inventor: Masashi Nagano, Izumi, Japan
[73] Assignee: Shimano Industrial Company Limited, Osaka, Japan
[21] Appl. No.: 581,048
[22] Filed: Feb. 17, 1984
[30] Foreign Application Priority Data Feb. 22, 1983 [JP] Japan .................................. 58-29046
May 9, 1983 [JP] Japan .................................. 58-81428

[51] Int. Cl.³ .......................... F16H 9/00; F16H 11/00
[52] U.S. Cl. ......................................... 474/80; 474/82
[58] Field of Search ................................. 474/80-83, 474/3, 6, 122, 78

[56] References Cited

U.S. PATENT DOCUMENTS

| 2,839,939 | 6/1958 | Juy ........................................ 474/80 |
| 4,322,209 | 3/1982 | Shimano ................................ 474/82 |
| 4,384,864 | 5/1983 | Bonnard .......................... 474/80 X |
| 4,406,643 | 9/1983 | Shimano .......................... 474/80 X |

Primary Examiner—Stephen J. Novosad
Assistant Examiner—Thuy M. Bui
Attorney, Agent, or Firm—Stevens, Davis, Miller & Mosher

[57] ABSTRACT

A derailleur for a bicycle has a base member, a movable member movable axially of a multi-stage sprocket assembly, a first feeding mechanism for moving the movable member, and a guide mechanism supported to the movable member and including a guide pulley and tension pulley for guiding the driving chain to one sprocket of the multi-stage sprocket assembly. The guide mechanism has a second feeding means including a controller actuated by operation of the first feeding mechanism to move the driving chain carried by the guide pulley axially of the multi-stage sprocket assembly by use of the movement of the chain. During changing, the chain is forcibly moved by the second feeding means to switch the chain to a desired sprocket.

12 Claims, 22 Drawing Figures

FIG. 3
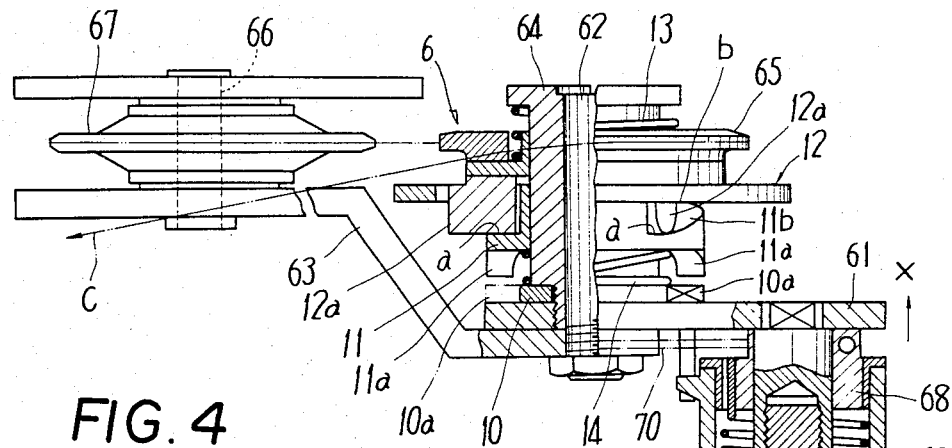
FIG. 4
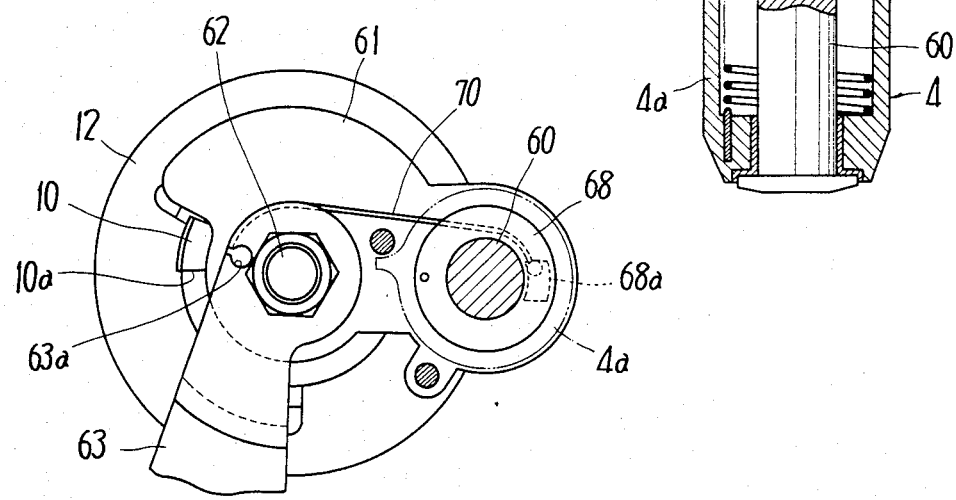
FIG. 5
FIG. 6
FIG. 7

DERAILLEUR FOR A BICYCLE

FIELD OF THE INVENTION

The invention relates to a derailleur for a bicycle and more particularly to a derailleur for a bicycle wherein a driving chain is switched to one sprocket of a multi-stage sprocket assembly mainly mounted to a rear hub of a rear wheel at the bicycle so as to make a speed-change.

BACKGROUND OF THE INVENTION

Conventionally, a derailleur for a bicycle comprises a base member, a movable member movable with respect to the base member and axially of the multi-stage sprocket assembly mounted to the bicycle, a feeding means for moving the movable member by use of an outside operation, and a guide mechanism supported to the movable member to guide the driving chain to one sprocket of the multi-stage sprocket assembly. Mainly, the outside operation through a control wire actuates the feeding means to move the movable member, so that the guide mechanism carries the driving chain axially of the multi-stage sprocket assembly and switches the chain from one sprocket to the other one, thereby performing a speed-change.

However, when the speed-changing is performed through the outside operation, especially for switching the chain from a smaller diameter sprocket to a larger diameter one, it often happens that any unskilled cyclist is apt to slowly perform the speed-change operation, and merely obtain insufficient operation magnitudes, so that the driving chain guided by the guide mechanism contacts or interferes on the way with the selected sprocket to make a noise and cause unexpected and unreasonable wear on the sprocket and the chain.

SUMMARY OF THE INVENTION

The invention has been designed to overcome these problems. An object of the invention is to provide a derailleur for a bicycle by which the chain can be quickly and effectively switched to a desired sprocket even when the speed-change operation is slowly performed and the operation magnitude is insufficient. In detail, the driving chain operates such that when the driving chain guided by the guide mechanism is switched for example from a smaller diameter sprocket to a larger diameter sprocket, the portion of the chain guided by the guide mechanism is moved axially of the sprockets to cause the chain to be slanted between the smaller diameter sprocket and the guide mechanism. But, the driving chain is subjected to a chain-tension, so that the chain tends to stay against the movement of the guide mechanism in the axial direction of the sprockets. Additionally, upon the speed-changing, the chain is driven by pedalling to run.

Accordingly, the invention provides a second feeding means which is actuated by the movement of the chain and which is formed at the guide mechanism so that the driving chain can be forcibly carried toward a selected sprocket irrespective of the operational technique or performance by the cyclist.

The invention provides a derailleur for a bicycle which comprises a base member, a movable member movable axially of a multi-stage sprocket assembly, a first feeding means for moving the movable member axially of the multi-stage sprocket assembly by use of an outside operation, and a guide mechanism supported to the movable member to guide the driving chain to one sprocket of the multi-stage sprockets, the invention being characterized in that the guide mechanism is provided with a controller actuated by movement of the guide mechanism through operation of the first feeding means, and provided with a second feeding means for moving the driving chain axially of the multi-stage sprockets due to the movement of the chain carried, such that it is placed on the guide pulley of the guide mechanism, so that upon a speed-change operation, the driving chain is forcibly moved axially of the multi-stage sprockets by use of the second feeding means so as to quickly and effectively switch the chain to a desired sprocket.

Furthermore, the instant applicant has observed that the driving chain, when generally switched by a derailleur to one sprocket of the multi-stage sprockets, is usually to be being driven. Accordingly, the invention makes use of the movement of the driving chain so as to forcibly move the chain axially of the multi-stage sprockets by means of the second feeding means, so that the chain can be always quickly and effectively switched to a selected sprocket irrespective of the operational technique or performance by the cyclist.

These and other objects and novel features of the invention will be more apparent from the following description of embodiments of the invention in accordance with the accompanying drawings.

BRIEF DESCRIPTION OF THE INVENTION

FIG. 1 is a front view of an embodiment of the derailleur for a bicycle of the invention, FIG. 2 is a plan view thereof, FIG. 3 is a partially cut-out enlarged side view thereof, FIG. 4 is a partially omitted enlarged front view thereof, FIG. 5 is an enlarged front view of the controller only, FIG. 6 is an enlarged rear view of the cam member, FIG. 7 is a side view thereof, FIG. 8 is an enlarged front view of the engaging member only, FIG. 9 is a longitudinal sectional side view thereof, FIG. 10 is an enlarged longitudinal sectional side view of the guide pulley only, FIGS. 11 and 12 are explanatory views of the principal part in condition of operation, FIGS. 13 through 18 show a modified embodiment of a bicycle according to the present invention, FIG. 13 is a front view thereof, FIG. 14 is a partially cut-off bottom view, FIG. 15 is an enlarged sectional view of the principal part, FIG. 16 is a perspective view of the controller, FIGS. 17 and 18 are an enlarged bottom view corresponding to FIG. 14, showing the operational condition, FIG. 19 is a partially cut-off bottom view showing a further modified embodiment, corresponding to FIG. 14, FIGS. 20 through 22 show another modified embodiment of a bicycle according to the present invention, FIG. 20 is a front view of the principal part of the modified embodiment, FIG. 21 is a plan view thereof, and FIG. 22 is a perspective view of the support member and the controller.

DETAILED DESCRIPTION OF THE INVENTION

Figure 1:
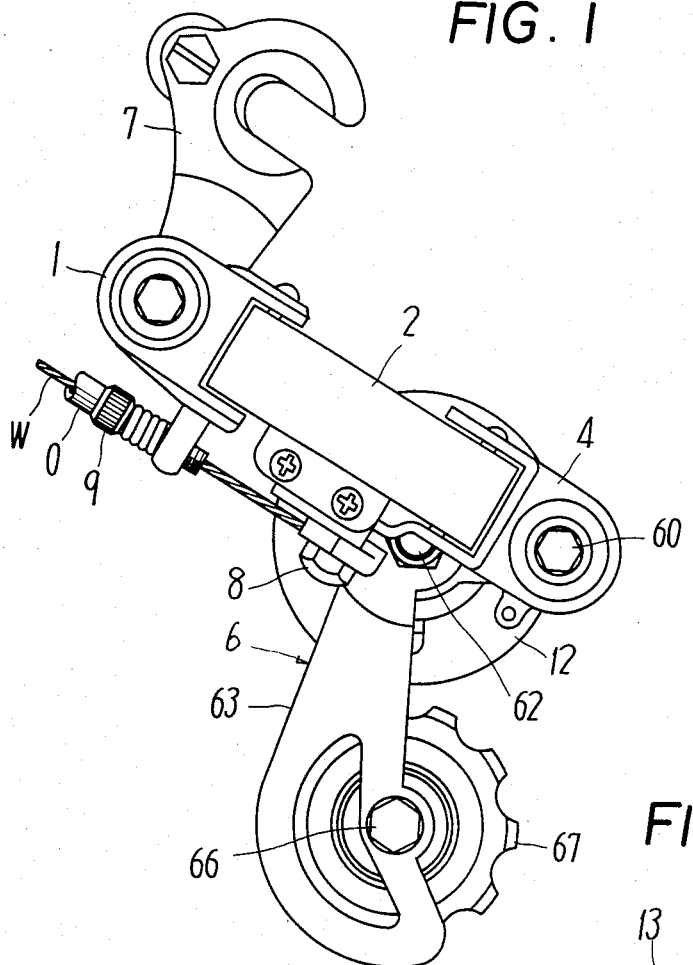
Figure 2:
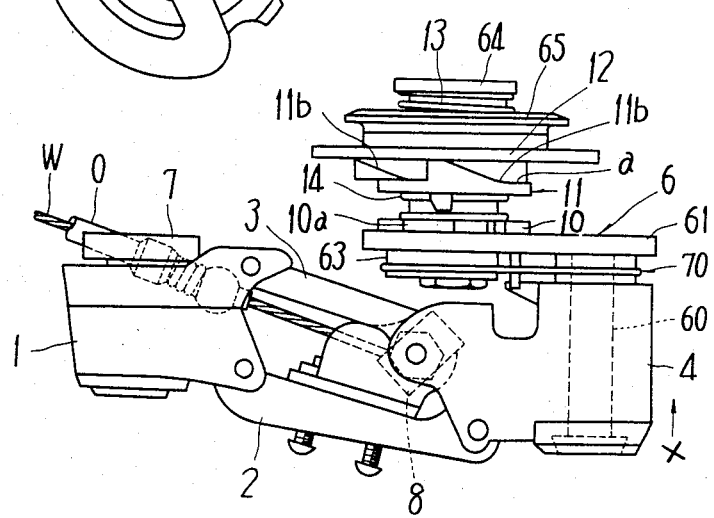

The drawings show a rear derailleur for a bicycle. The rear derailleur essentially comprises, as shown in FIGS. 1 and 2, a base member 1; a movable member 4; a first feeding means for moving the movable member 4, by an outside operation, with respect to the base member 1 in the axial direction of a multi-stage sprockets assembly; and a guide mechanism 6 having a guide pulley 65 and a tension pulley 67 and supported to the movable member 4 for guiding a driving chain C to one of the sprockets at the multi-stage sprocket assembly. The first feeding means employs a pair of linkage members 2, 3 which are adapted to swing with respect to the base member 1 to move the movable member 4 axially of the multi-stage sprocket assembly. The abovesaid construction is a typical one for a rear derailleur and the first feeding means is not necessarily defined as the linkage members 2, 3.

Next, details of the derailleur constructed as abovesaid are explained. The base member 1 is mounted through a bracket 7 to a back fork (not shown) to which a rear-wheel hub for a bicycle is supported. Means necessary for the outside operation to actuate the first feeding means comprising the linkage members 2, 3 employs a control wire W, and a fixture 8 for the control wire W is formed at the movable member 4, and a support 9 for an outer sheath O guiding the wire W is formed at the base member 1, so that the movement of the wire W by the outside operation and operation of a return spring (not shown) causes movable member 4 to move backward and forward with respect to the base member 1 in the axial direction of the multi-stage sprocket assembly by means of the first feeding means.

The guide mechanism 6 comprises a first pivot shaft 60 rotatably supported to the movable member 4, a first support member 61 connected relatively non-rotatably to the first pivot shaft 60 but swingably supported to the movable member 4 therethrough, a second pivot shaft 62 fixed to a free end of the first support member 61, a second support member 63 supported swingably by the second pivot shaft 62, a tubular pulley shaft 64 fitted onto the outer periphery of second pivot shaft 62 and fixed to the first support member 61, a guide pulley 65 rotatably and axially movably supported by the pulley shaft 64, and a tension pulley 67 rotatably supported to the free end of second support member 63 through a support shaft 66. A rotary member 68 connected relatively not-rotatably to the first support member 61 is supported rotatably to the outer periphery of the first pivot shaft 60. Between the rotary member 68 and the movable member 4 is interposed a tension spring 69 for rotating the rotary member 68 in the direction of giving a chain-tension to the chain C. Additionally, between the second support member 63 and the rotary member 68 is provided an association mechanism 70 for applying the spring force of the spring 69 to the second support member 63 at a given constant ratio.

The movable member 4 has a tubular portion 4a as shown in FIG. 3 and houses therein rotatably the first pivot shaft 60 to which the first support member 61 is fixed. The spring 69 employs a coil spring. The spring 69 and the rotary member 68 are housed within the tubular portion 4a, the spring 69 being retained at one end to an end wall of the tubular portion 4a and at the other end to the rotary member 68.

The association mechanism 70 employs, for example, a wire as shown, each ends of the wire being retained to respective retaining grooves 68a, 63a provided at the rotary member 68 and second support member 63 respectively.

In the first embodiment shown in FIGS. 1 through 12, the derailleur constructed as abovesaid is provided between the first support member 61 and the guide pulley 65 of the guide mechanism 6 with a second feeding means comprising a controller 10, cam member 11 and engaging member 12.

In detail, the controller 10 having four lock portions 10a is supported non-rotatably to the root of the pulley shaft 64 of the guide mechanism 6. The cam member 11 is provided having stoppers 11a engageable with the lock portions 10a and cam faces 11b having a variation of height along the axial direction of the pulley shaft 64, and the engaging member 12 is provided having engaging projections 12a engageable with the cam face 11b. The cam member 11 and the engaging member 12 are rotatably and slidably supported with respect to the pulley shaft 64. The guide pulley 65 is fixed to the engaging member 12 by a screw member, so that the guide pulley can rotate together with the engaging member 12. A first elastic member 13 is interposed between the outer surface of engaging member 12 and the end of pulley shaft 64 to urge the engaging member 12 toward the cam member 11, so that the engaging projection 12a is always engaged with the cam face 11b. A second elastic member 14 is interposed between the controller 10 and the cam member 11 so as to urge the cam member 11 in the direction of moving away from the controller 10, so that the engaging member 12 and cam member 11 are allowed to be rotatable with respect to the controller 10.

In case that the wire W is operated to move through the first feeding means the movable member 4 in the axial direction (Arrow X direction in FIGS. 2 and 3) of the multi-stage sprockets from the smaller diameter sprocket to the larger one, the driving chain C is subjected to a chain-tension by means of the tension spring 69, so that the guide pulley 65 carrying the chain C tends to stay at a position corresponding to a smaller diameter sprocket onto which the chain is originally or previously held, but the guide pulley does not move simultaneously together with the movable member 4 and each of the support members 61, 63. Hence, while each support members 61, 63 and the controller 10 move together with the movable member 4 upon its movement, the guide pulley 65, the cam member 11, and the engaging member 12, all of which are supported to the pulley shaft 64 rotatably and axially movably relative thereto, remain stationary. As a result, controller 10 and the cam member 11 opposite thereto have therebetween a relative movement in the axial direction of the pulley shaft 64 against the elastic members 13, 14, thereby allowing the stopper 11a of the cam member to engage with the lock portions 10a of the controller to prevent the cam member 11 from rotating. In this instance, when the chain C is running by pedalling, the running of chain C rotates the guide pulley 65 and the engaging member 12 with respect to the cam member 11, so that the engaging projection 12a travels on the cam face 11b from its lowermost portion a toward a top portion b, thereby forcing the engaging member 12 and guide pulley 65 in the direction of moving away from the cam member 11 and toward the next sprocket to which the chain C is to be switched.

In the abovesaid construction, the controller 10 is, as shown in FIG. 5, made of a disc having at the center a through bore and at the outer peripheral surface the four lock portions 10a.

The cam member 11 is, as shown in FIGS. 6, 7, formed in a tubular shape and is provided at the center with a through bore, at one side surface with the four stoppers 11a, and at the other side surface with the three cam faces 11b peripherally extending and axially slanted.

Figure 8:
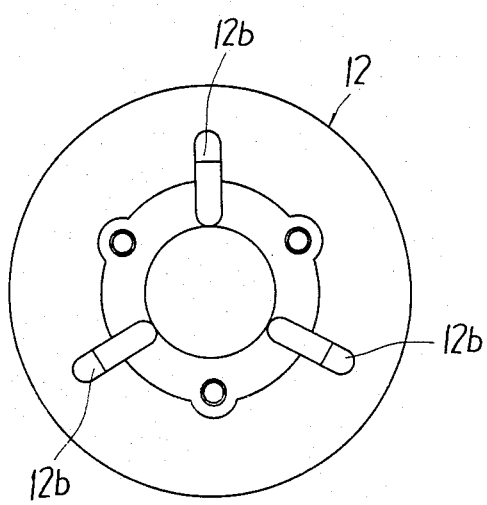
Figure 9:
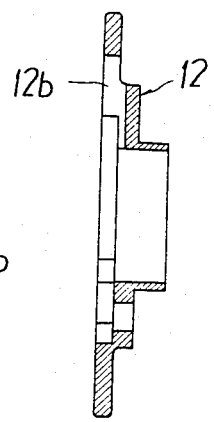
Figure 10:
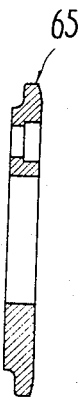

The engaging member 12 is formed, as shown in FIGS. 8 and 9, in a tubular shape and is provided at the center with a through bore and at one side surface with three holding bores 12b to which the separately formed engaging projections 12a are detachably supported. The guide pulley 65 is mounted to the other side surface of the engaging member 12 by means of a tightening screw. The first and second elastic members 13, 14 employ coil springs.

Next, operation of the derailleur constructed as abovesaid will be detailed.

Figure 11:
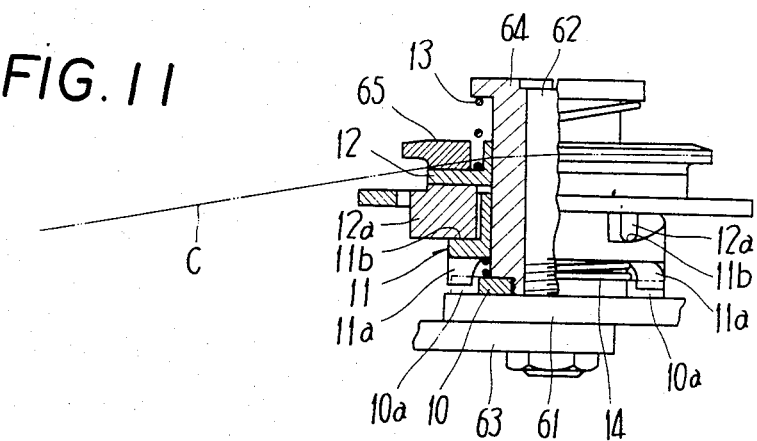
Figure 12:
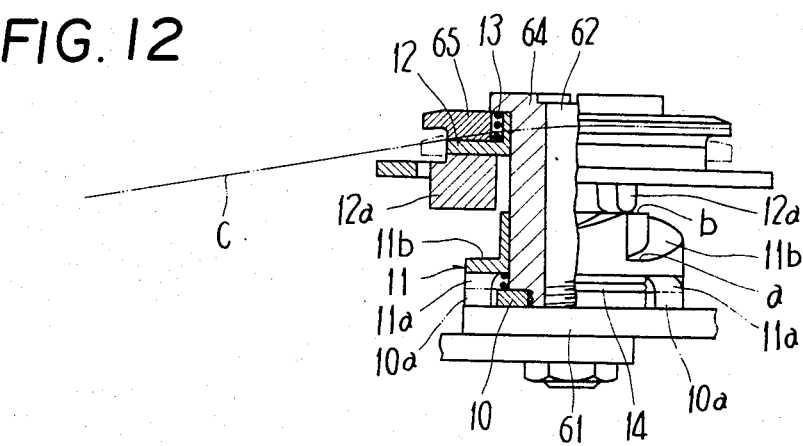

In the derailleur shown in FIGS. 2 and 3, the movable member 4 is positioned at the smaller diameter sprockets side of the multi-stage sprockets, and the driving chain c guided by the guide mechanism 6 is held on a smaller diameter sprocket. In this instance, when the control wire W is pulled, the movable member 4 supporting the guide mechanism 6 is moved with respect to the base member 1 toward the larger sprockets side (in the arrow X direction in FIGS. 2, 3). In this instance, the driving chain c is subjected to a chain-tension as aforesaid, and the chain-tension causes the guide pulley 65, engaging member 12 and cam member 11 to tend to stay at a position corresponding to the smaller sprocket onto which the chain is originally previously held, but the guide pulley, engaging member and cam member do not move toward the larger sprockets side. At the same time, the movable member 4 and each of the support members 61, 63 supported thereto move toward the larger sprockets side and the controller 10 moves against the second elastic member 14 relative to the guide pulley 65, engaging member 12 and cam member 11 in the direction of (moving toward the larger sprockets side and) approaching the cam member 11. Thus as shown in FIG. 11, stoppers 11a of the cam member 11 engage with the lock portions 10a of controller 10 to prevent rotation of the cam member 11 which is rotated together with the rotated guide pulley 65 through the driven chain c. Hence, guide pulley 65 and engaging member 12 rotate with respect to the cam member 11, so that the engaging projection 12a travels, as shown in FIG. 12, on the cam face 11b from the lowermost portion a toward top portion b so as to move the engaging member 12 and guide pulley 65 away from the cam member 11 (in the direction of moving toward the larger sprockets side). Hence, the driving chain c guided by the guide pulley 65 does not stop at an intermediate position between the smaller diameter sprocket and the larger one but is forcibly carried to a position where the chain is engaged with the larger diameter sprocket, thereby providing always effective engagement of the chain with the larger diameter sprocket.

The engaging member 12 moves, as abovesaid, relative to the cam member 11 so that the chain c is switched to the larger diameter sprocket, then the engaging projection 12a passes the top portion b of the cam face 11b to be ready to engage with a next lowermost portion a. The chain-tension of the chain c applied to the guide pulley 65 and the biasing force by the first elastic member 13 cause engaging member 12 to move backward slightly toward the cam member 11 (i.e., the smaller sprockets side). Simultaneously, restoration force of the second elastic member 14 causes cam member 11 to move backward away from the controller 10 (i.e., toward the larger sprockets side), so that the engaging projection 12a comes to engage with the lowermost portion a of the cam face 11b, and the stoppers 11 are disengaged from the lock portions 10a. This enables cam member 11 to rotate together with the engaging member 12 and guide pulley 65 so as to allow the guide pulley 65 to come to a position corresponding to the tension pulley 67.

In the abovesaid embodiment, the controller 10 is connected not-rotatably to the first support member 61 but may alternatively be integrally formed therewith.

Alternatively, the engaging member 12 may be formed integrally with the guide pulley 65.

FIGS. 13 through 18 show a modified embodiment. Different features from those in the first embodiment are such that an operating means 30 is provided at the first feeding means to be actuated by the outside operation. A controller 100 is provided rotatably to the movable member 4 to which a guide pulley 165 is merely rotatably supported. Between the controller 100 and the guide pulley 165 is provided a clutch means which is engaged by actuation of the controller 100 through operation of the operating means 30 to rotate the controller 100 corresponding to rotation of the guide pulley 165 rotated by the driving chain c, thereby moving the movable member 4 axially of the multi-stage sprocket assembly.

Figure 14:
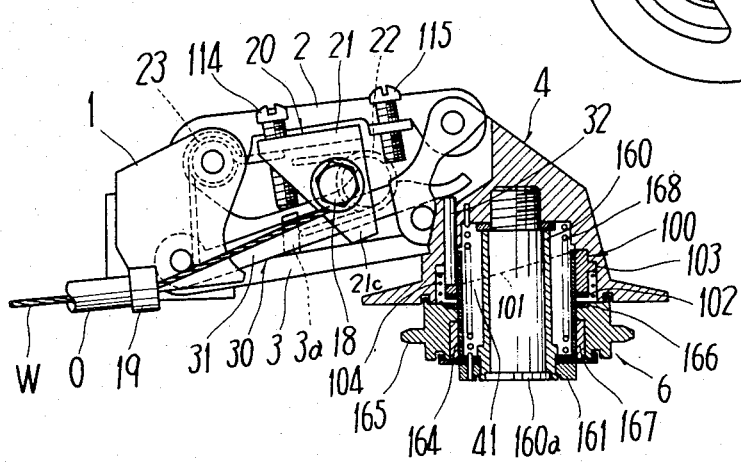

In this second embodiment, the movable member 4 is provided, as shown in FIG. 14, at one side with a cylindrical cavity 41. A pivot shaft 160 and a pulley shaft 164 supporting rotatably the guide pulley 165 are fitted into the cavity 41 at its central portion and tightened by a tightening bolt 160a. Pivotally supported to the base member 1 are a clutch lever 31 constituting the operating means 30 and a saver arm 21 constituting a saver mechanism 20 described later. Between the clutch lever 31 and saver arm 21 is interposed a saver spring 22 having at its intermediate part a coiled portion. Between the base member 1 and the saver arm 21 is interposed a return spring 23. The saver arm 21 is provided with a fixture 18 for the control wire W, and the base member 1 is provided with a support 19 for an outer sheath O guiding the control wire W.

The clutch lever 31 is extended toward the movable member 4 and opposites at this extension thereto, and the movable member 4 is provided at the corresponding opposite portion with a push rod 32, which constitutes the operating means 30, extends parallel to the pivot shaft 160, and is axially movable thereof.

Figure 16:
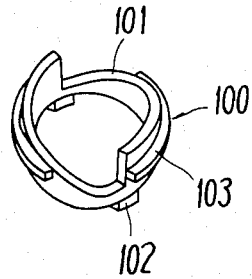

The controller 100 is formed in a tubular shape and made larger in inner diameter than the outer diameter of the pulley shaft 164 as shown in FIG. 16, and is provided at one axial end surface with a slanted cam face 101 peripherally extending and axially slanted, and at another axial end surface with a clutch projection 102. The guide pulley 165 is provided at its opposite surface to the controller 100 with a clutch projection 166 corresponding to the clutch projection 102.

The controller 100 is rotatably and axially movably supported to the pulley shaft 164 within the cavity 41 of the movable member 4.

The push rod 32 is faced to the cam face 101 of the controller, so that the push rod 32 is moved to push out the controller 100 axially outwardly of the pulley shaft 164.

The controller 100 is provided at its outer peripheral surface with a guide 103 serving also as a spring retainer and projecting radially outwardly. Between the guide 103 and the guide pulley 165, which is merely rotatably supported to the pulley shaft 164 through a bush 167, is interposed a return spring 104 for urging the controller 100 toward the push rod 32.

The return spring 104 pushes the controller 100 toward the push rod 32 for maintaining a disengagement between the controller 100 and the guide pulley 165 at their clutch projections 102 and 166. Specific construction thereof in the second embodiment shown in FIGS. 13 through 18 is as follows.

One sprocket of the multi-stage sprockets when it holds the chain has at its side surface of the sprocket teeth a play with respect to the inner surface of the inner link plates of the chain, so that when the guide mechanism 6 is axially moved, the chain is first moved for absorbing the play, then is disengaged from the sprocket to move toward a next sprocket to which the chain is switched. In this second embodiment, the return spring 104 is adapted to have a larger spring force, so that when the chain is shifted, the movable member 4 and guide mechanism 6 are first moved together with the guide pulley 165 through the return spring 104 so as to absorb the aforesaid play, then are forcibly moved by means of the cam face 101 of the controller 100. In detail, the spring force of the return spring 104 is made larger than the resistance applied to the movement of the abovesaid components for absorbing the play at the chain.

The saver mechanism 20 is adapted for enabling the control wire operation under a larger resistance even in a case where the chain c when not being driven is switched by pulling control wire W. The saver mechanism 20 comprises the saver arm 21 and the saver spring 22.

Figure 15:
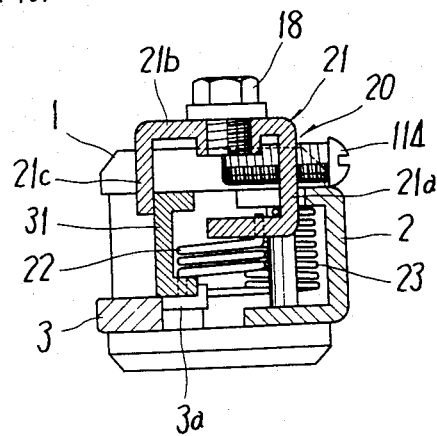

The saver arm 21 comprises, as shown in FIG. 15, a rising portion 21a at the foremost end, an extension 21b extending therefrom one-sidedly, and an engaging portion 21c extending downwardly from the free end of the extension 21b. The engaging portion 21c is adapted to abut to the outer surface of the clutch lever 31, so that the clutch lever 31 follows the returning operation of the return spring 23 through the saver arm 21.

The link member 3 constituting the first feeding means is provided at the intermediate portion of the link member with an arm portion 3a which abuts to the inner side surface of the clutch lever 31, so that the link member 3 follows the clutch lever 31 through returning operation of the return spring 23.

Figure 13:
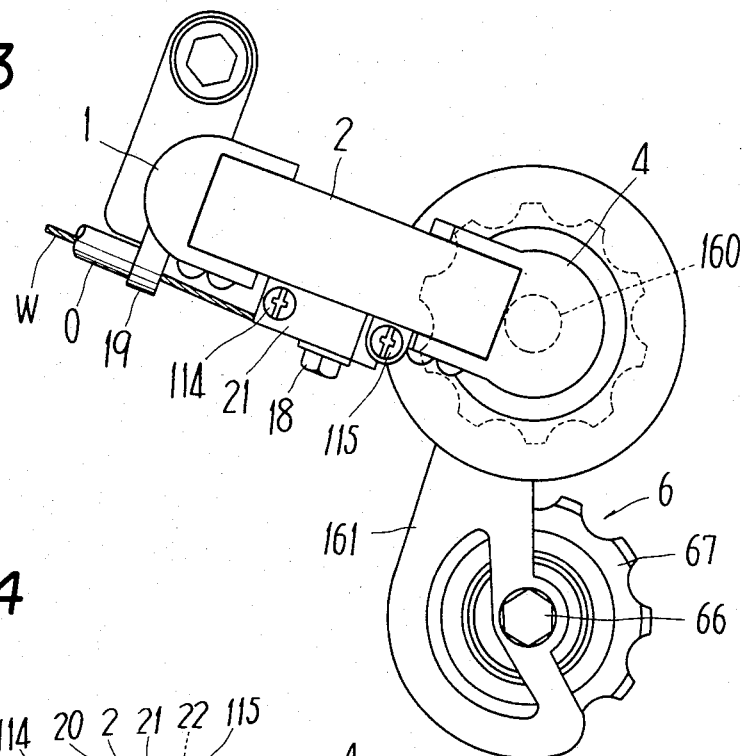

In FIGS. 13 through 15, reference numerals 114, 115 designate adjustment bolts for restraining the extent of movement of the movable member 4. The adjustment bolt 114 is adjustably supported to the saver arm 21, and adjustment bolt 115 to the link member 2.

Reference numeral 168 designates a tension spring for biasing the support member 161 (swingably supported to the pivot shaft 160) in the direction of giving a chain-tension to the chain. The tension spring 168 is freely fitted onto the pivot shaft 160 and retained at one end to the movable member 4 and at the other end to the support member 161.

Figure 17:
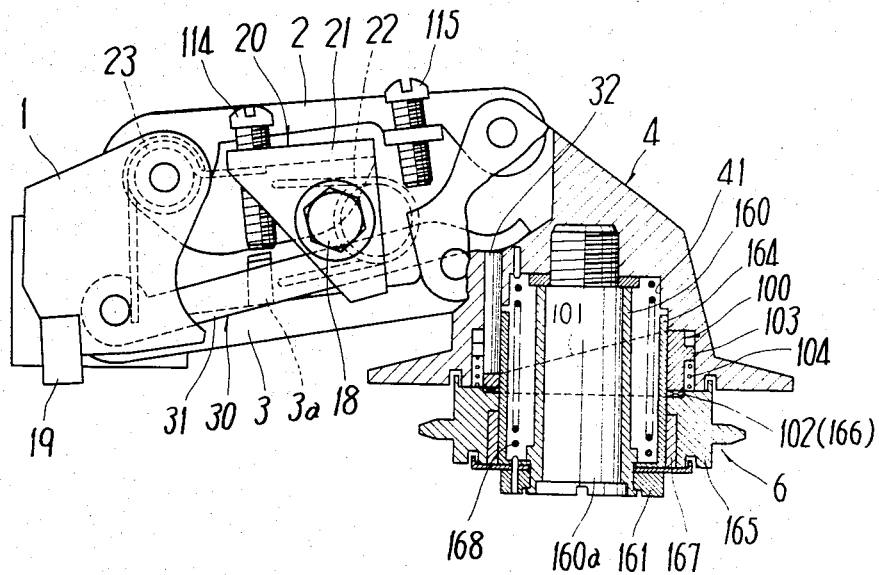
Figure 18:
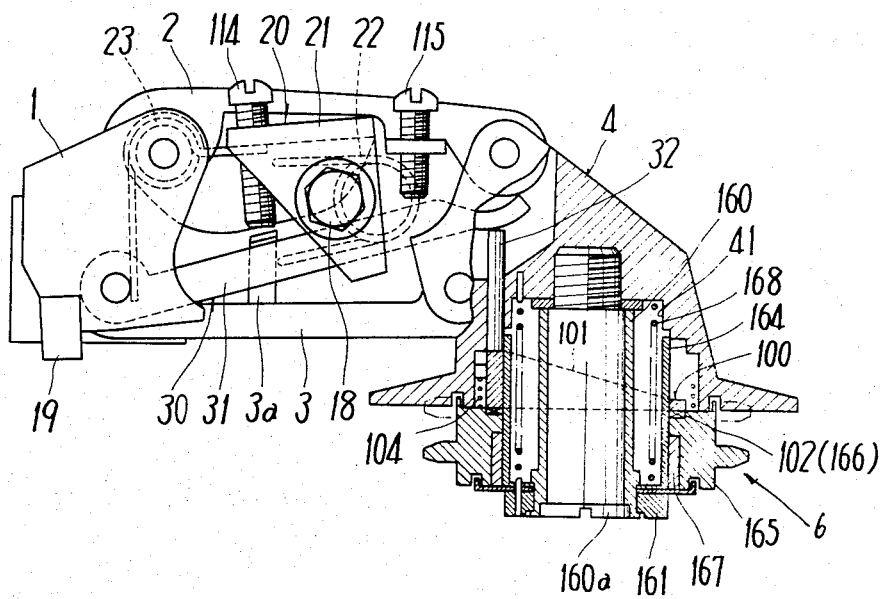

Next, operation of the embodiment shown in FIG. 13 will be detailed according to FIGS. 14, 17 and 18.

In FIG. 14, the movable member 4 and guide mechanism 6 are placed at the smaller sprocket side of the multi-stage sprockets assembly, and the chain guided by the guide mechanism is held on one smaller sprocket. In this instance, when the control wire W is pulled, the saver arm 21 swings clockwise against the return spring 23 in FIG. 14 so as to deflect the saver spring 22.

In this instance, when the chain is driven, the clutch lever 31 swings clockwise in FIG. 14 by means of the saver spring 22 to allow the push rod 32 to push out the controller 100 against the return spring 104 axially outwardly of the pulley shaft 164, thereby engaging the clutch projections 102, 166 with each other. In this second embodiment, prior to the engagement of the clutch projections, the movable member 4 and guide mechanism 6 are moved by means of the return spring 104.

In detail, the return spring 23 is restrained by the swinging of the saver arm 21, and the movable member 4 is in a condition of being freely movable by means of the link members 2, 3. Thus, the operating force applied to the clutch lever 31 is transmitted through the return spring 104 to the movable member 4 and guide mechanism 6 to move the movable member and guide mechanism toward the larger sprockets side, thereby absorbing the abovesaid play at the chain with respect to the smaller diameter sprocket. The absorption of the play leads to that the chain in movement comes to be subjected to a larger resistance than a resistance applied to the chain upon absorbing the play, so that the return spring 104 is contracted to thereby engage the clutch projections 102, 166 as shown in FIG. 17.

The engagement of the clutch projections 102, 166 causes the controller 100 to rotate due to and together with the guide pulley 165 in rotation driven by the chain, thereby urging the controller 100 to move toward the guide pulley 165 by means of and with respect to the push rod 32 engaging with the cam face 101 of the controller as shown in FIG. 18.

In this instance, the push rod 32 is locked with respect to the base member 1 by means of the clutch lever 31 through the control wire operation, so that the movable member 4 and guide mechanism 6 are forcibly moved toward the larger sprockets side by means of the link members 2, 3, thereby switching the chain guided by the guide mechanism 6 to the selected larger diameter sprocket.

After the controller 100 rotates corresponding to rotation of the guide pulley 165 to carry the chain together with the movable member 4 and guide mechanism 6, the push rod 32 falls to a lower portion of the cam face 101 of the controller 100, so that the controller 100 returns to the original position by means of the return spring 104 to have a relationship of original placement with the clutch lever 31 and push rod 32 as shown in FIG. 14.

When the chain shifted to the larger sprocket as abovesaid is re-switched to the smaller sprockets, the control wire W is slackened to allow the saver arm 21 and clutch lever 31 to swing counterclockwise in FIG. 14 by operation of the return spring 23 so as to pull the linkage member 3, thereby moving backward the movable member 4 and guide mechanism 6 to switch the chain to the smaller sprocket. In this instance, the backward movement of the movable member and guide mechanism is performed only by the returning operation of the return spring 23 while the second feeding means does not function at in this instance.

In case that the chain is switched from a smaller sprocket to a larger sprocket, when the control wire W is pulled with the chain being not driven to be in a halt, the return spring 23 and saver spring 22 are deflected to be energized, so that when the chain is driven, the clutch lever 31 is actuated to switch the chain to the larger sprocket in the abovesaid manner and operation.

In the abovesaid embodiment, the saver arm 21 is employed but is not indispensable. In such case, the clutch lever 31 may be provided with the fixture for the control wire.

Figure 19:
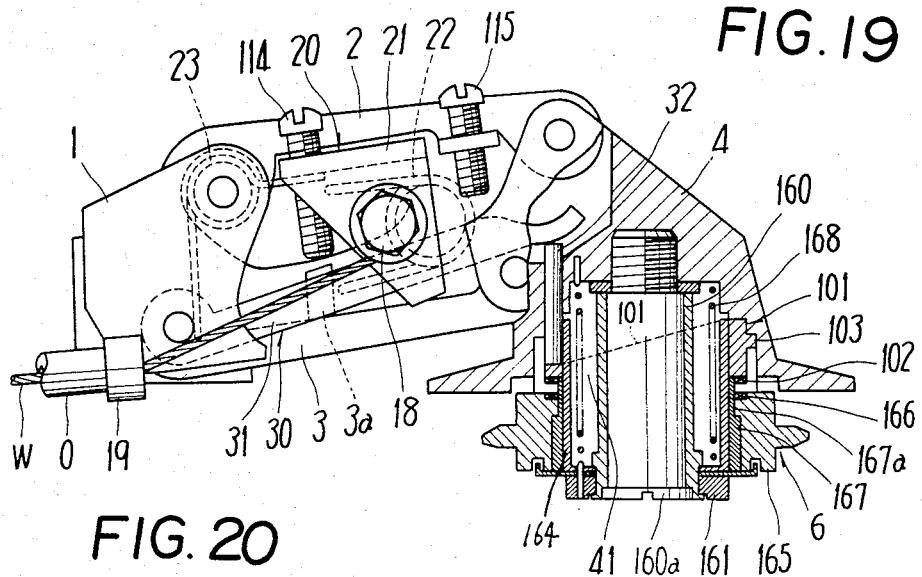

Alternatively, the return spring 104 between the controller 100 and guide pulley 165 may be omitted. In such case, the bush 167 supporting rotatably the guide pulley 165 is fixed to the pulley shaft 164 as shown in FIG. 19, and is provided with an extension cylinder 167a which abuts to the edge face of the controller 100 without interfering with the clutch projection 102 thereof. Also, the guide pulley 165 is supported to the bush 167 and extension cylinder 167a axially movably relative to each other.

It will be appreciated in this construction that there is provided an interval or room between the clutch projection 166 of the guide pulley 165 and the clutch projection 102 of the controller 100 for the disengagement of these projections.

It will be also appreciated that the controller 100 contacts with the extension cylinder 167a so that it rotates around the pulley shaft 164 but does not move axially with respect to the movable member 4.

In this construction, when the wire W is pulled as the second embodiment, the clutch lever 31 is actuated by means of the saver arm 21 and saver spring 22 so as to push out the push rod 32. This in turn pushes the controller 100 to urge the extension cylinder 167a, bush 167 and pulley shaft 164 fixed to the movable member 4 so as to allow the movable member 4 to move together with the link members 2, 3.

In this instance, the guide pulley 165 carries with the chain so that the guide pulley is subjected in its axial movement to a resistance by the chain-tension applied to the chain. In other words, the resistance applied to the movement of the guide pulley 165 becomes larger than the resistance applied to the movement of the movable member 4, so that the movable member 4 together with the controller 100 can be moved while the guide pulley 165 is halted, thereby engaging the clutch projection 102 of the controller 100 with the clutch projection 166 of the guide pulley 165.

After the engagement of the clutch projections, the controller 100 rotates together with the guide pulley 165 as the second embodiment, and the movable member 4 is conveyed together with the guide pulley 165 by use of the push rod 32 abutting to the cam face 101, thereby switching the chain carried by the guide pulley 165 to a desired sprocket.

After switching the chain, the push rod 32 comes to face with a lower portion of cam face 101 of the controller 100, and the movable member 4 becomes free to move backward. The guide pulley 165 is subjected in its axial movement to a resistance by the chain-tension, so that vibrations of the bicycle or returning operation of the return spring 23 causes the movable member 4 to move backward, thereby disengaging the clutch projections 102, 166.

In the case where the returning operation of the return spring 23 is adapted to disengage the clutch projections 102, 166, the measurement extent of height between the lowermost portion and top portion at the cam face 101 of the controller 100 may be made slightly larger than the intervals between the sprockets.

The controller 100 is provided between the movable member 4 and the guide pulley 165, but alternatively may be arranged at the outer side of the guide pulley 165 and at the end side of the pivot shaft 160 or pulley shaft 164, and the clutch means is provied between the outer side surface of the guide pulley 165 and the corresponding opposite inner side surface of the controller. For the purpose, the pivot shaft 160 or pulley shaft 164 is provided with a fixing member to which the cam face 101 of the controller 100 is opposed, and the fixing member is provided with a projecting engaging pin engageable with the cam face 101.

In this case, the guide pulley 165 is slidably supported to the pulley shaft 164.

Additionally, the fixture 18 of the control wire W is provied at the saver arm 21 or clutch lever 31, or may alternatively be formed at the base member 1, and the support 19 for the outer sheath O may be provided at the saver arm 21 or the clutch lever 31.

Figure 20:
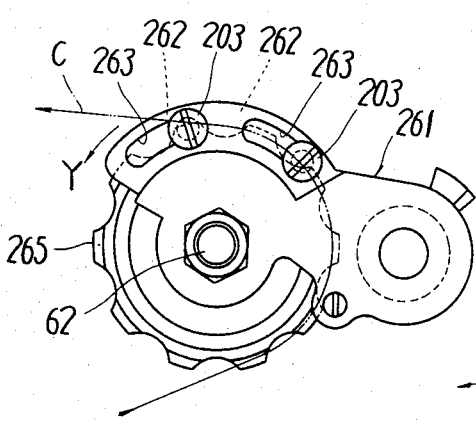
Figure 21:
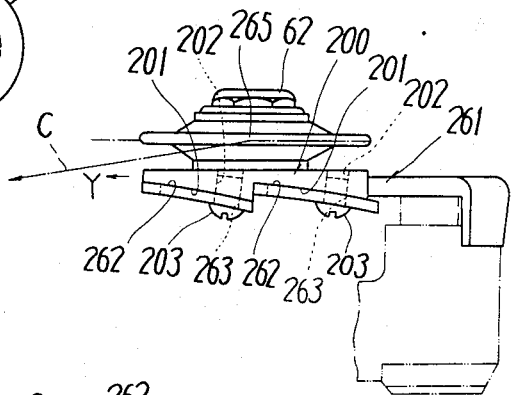
Figure 22:
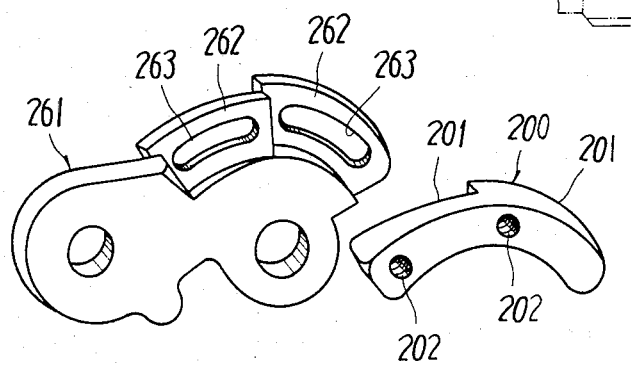

FIGS. 20 through 22 show a further modified embodiment wherein a support member 261 for a guide pulley 265 is provided with two cam faces 262, 262 each having an elongate throughbore 263, the cam faces 262 facing toward the peripheral inner side surface of the guide pulley 265 and slantwise forwardly extending along and toward the normal rotation direction thereof. Also, an arcuate controller 200 is provided having tow slanted faces 201, 201 with threaded throughbores 202, 202 perforating therethrough, with the slanted faces 201 extending slantwise correspondingly to the cam faces 262 and contacting therewith. The controller 200 is movably supported to the elongate bore 263 portions of the support member 261 by means of mounting screws 203 screwed with the threaded bores 202, so that the outside surface of the controller 200 is faced toward the outside surface of outer link plates of the driving chain c. When the support member 261 and controller 200 are axially moved, the controller 200 press-contacts with the outside surface of the driving chain c, so that a contact resistance due to the press-contact and a movement force of the chain in running cause the controller 200 to move along the cam faces 262 in the normal rotation direction of the guide pulley 265 (Arrow Y direction in FIGS. 20 and 21). As a result, controller 200 is displaced toward the chain c side to carry the chain c axially outwardly of the sprockets.

In detail, the chain c when placed on one sprocket of the multi-stage sprocket assembly has a play between the inner surface of inner link plates of the chain c and the side face of the teeth of the guide pulley 265, and the chain is subjected to a chain tension. When guide mechanism 6 is axially moved, it also moves relative to the chain c to absorb the play at the chain. In the FIGS. 20-22 embodiment, the controller 200 is adapted to press-contact with the outside face of the chain c when the guide mechanism 6 moves relative to the chain c. In this instance, it is preferable to provide a return spring for the controller 200 between the controller 200 and the support member 261, so that when the chain c is switched to one larger diameter sprocket to thereby release the press-contact of the controller 200 with the driving chain c, the controller 200 is returned to its original placement by means of the restoration force of the return spring.

As seen from the above, the invention provides that the chain can be forcibly moved to be quickly and effectively switched to a desired selected sprocket by use of the movement of the chain regardless of the operator's technique or actual performance for the speed-change operation. In other words, even when the speed-change operation is inaccurately performed by the operator, the chain can be quickly and effectively switched to a desired sprocket without keeping the poor contact of the chain with the sprocket, thereby eliminating noise-making due to such poor contact and reducing the unexpected and unreasonable wear on the sprocket and driving chain.

While preferred embodiments of the invention have been described using specific terms, such description is for illustrative purposes only, and it is to be understood that changes and variations may be made without departing from the spirit or scope of the invention as defined by the following claims.

What is claimed is:

1. A derailleur for a bicycle for switching a driving chain from one sprocket to another of a multi-stage sprocket assembly which is mounted to the bicycle, said derailleur comprising:
   a base member,
   a movable member movable axially of said multi-stage sprocket assembly,
   first feeding means for moving said movable member axially of said multi-stage sprocket assembly by means of an outside manual operation, and
   a guide mechanism supported to said movable member and including a guide pulley for guiding said driving chain to one sprocket of said multi-stage sprocket assembly and a tension pulley, said guide mechanism having a controller actuated by movement of said guide mechanism through operation of said first feeding means, said guide mechanism further comprising second feeding means for moving said chain axially of said multi-stage sprocket assembly in cooperation with movement of said driving chain positioned on said guide pulley.

2. A derailleur for a bicycle according to claim 1, wherein said guide mechanism includes a support member supporting said guide pulley, said guide pulley being supported to said support member movably axially of said multi-stage sprocket assembly, said second feeding means being interposed between said support member and said guide pulley, said guide pulley carrying said chain being movable axially of said multi-stage sprocket assembly by said second feeding means.

3. A derailleur for a bicycle according to claim 2, wherein said support member includes shaft means, and said second feeding means includes a controller which is not rotatable with respect to said shaft means of said support member and which is provided with at least one lock portion, said second feeding means comprising a cam member including a stopper engageable with said at least one lock portion of said controller and a cam face having a height which varies axially of said multi-stage sprocket assembly, said second feeding means further comprising an engaging member which is fixed to said guide pulley and which includes an engaging projection engageable with said cam face of said cam member, said cam member and said engaging member being rotatably and slidably supported to said shaft means, so that said first feeding means is operable to axially move said movable member to thereby allow said controller to approach said cam member and allow said stopper of said cam member to engage with said at least one lock portion to prevent rotation of said cam member, whereby said guide pulley and said engaging member are moved axially of said multi-stage sprocket assembly through rotation of said guide pulley rotated by said chain.

4. A derailleur for a bicycle according to claim 3, wherein said controller is integral with said support member.

5. A derailleur for a bicycle according to claim 3, wherein said engaging member is integral with said guide pulley.

6. A derailleur for a bicycle according to claim 2, wherein said guide mechanism includes returning means for returning said guide pulley with respect to movement of said guide pulley by said second feeding means.

7. A derailleur for a bicycle according to claim 1, wherein said first feeding means comprises operating means actuatable by outside manual operation, said controller includes a cam which has a cam face which bears against said operating means, said cam being for moving said movable member axially of said multi-stage sprocket assembly by cam action on said operating means, said controller being rotatable relative to said movable member, said derailleur further comprising clutch means for engaging said controller and said guide pulley, said clutch means being engageable by actuation of said controller through operation of said operating means, said clutch means being for rotating said controller corresponding to rotation of said guide pulley caused by said driving chain, whereby rotation of said controller causes said movable member to move axially of said multi-stage sprocket assembly.

8. A derailleur for a bicycle according to claim 7, wherein said controller is axially moveable with respect to said guide pulley, whereby said operating means is actuatable to move said controller to engage said clutch means.

9. A derailleur for a bicycle according to claim 7, wherein said guide mechanism includes a support member having a pulley shaft, and said guide pulley is movably supported to said pulley shaft, whereby said operating means is actuatable to axially move said movable member and to move said controller together with said movable member with respect to said guide pulley to engage said clutch means.

10. A derailleur for a bicycle according to claim 7, wherein said operating means includes a clutch lever and a push rod which bears against said controller, said clutch lever being actuatable by operation of a control wire.

11. A derailleur for a bicycle according to claim 10, wherein said derailleur comprises a saver mechanism including a saver arm and a saver spring, said saver spring being interposed between said saver arm and said lever of said operating means.

12. A derailleur for a bicycle according to claim 1, wherein said guide mechanism comprises a support member supporting said guide pulley, said second feeding means including an actuate controller means opposite to said chain positioned on said guide pulley, a cam having a cam face at an opposing surface between said support member and said controller, said cam for moving said controller axially of said multi-stage sprocket assembly, said controller being supported to said support member slidably in a rotation direction of said guide pulley, whereby said first feeding means is operable to move said movable member to slide said controller with respect to said support member and to move said chain positioned on said guide pulley in the axial direction of said multi-stage sprocket assembly.

* * * * *